H. Z. COBB.
PROCESS AND APPARATUS FOR PRODUCING A HOLLOW RUBBER BISCUIT.
APPLICATION FILED SEPT. 23, 1919.
1,349,560.  Patented Aug. 17, 1920.
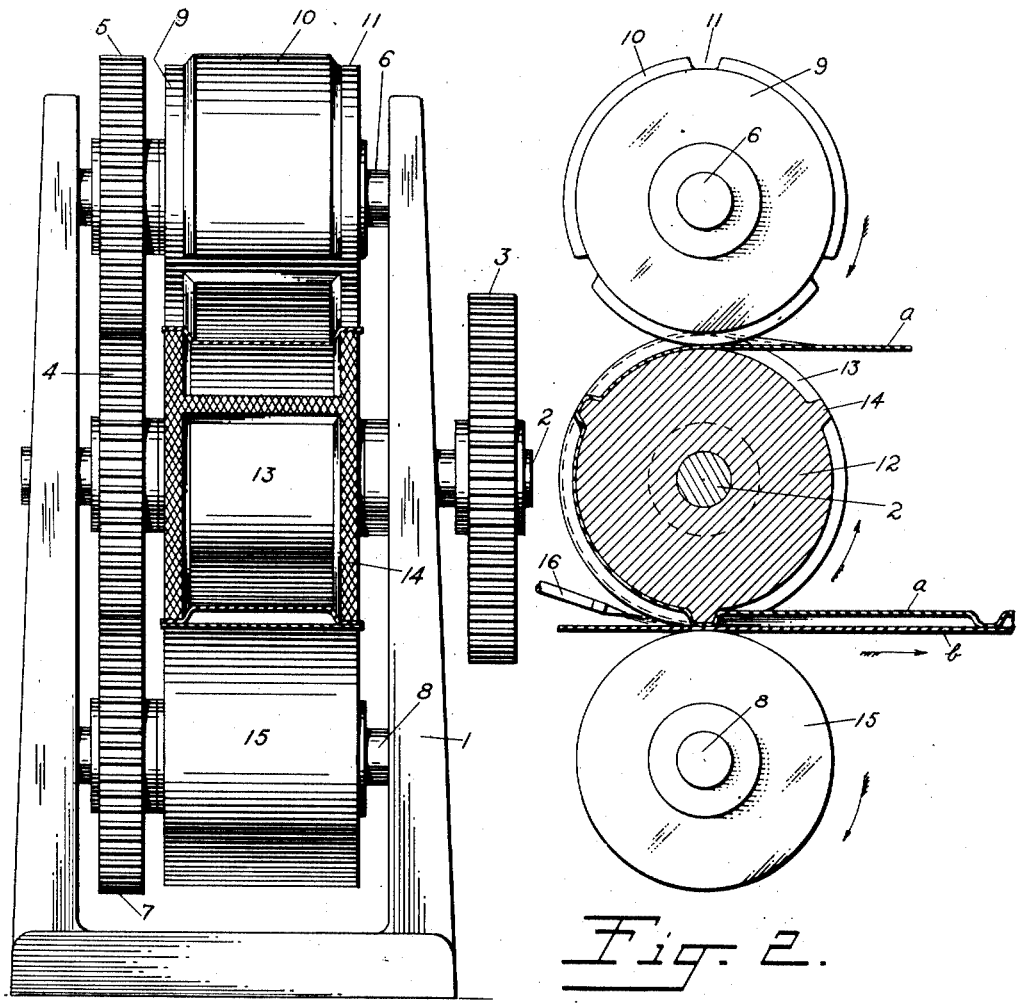
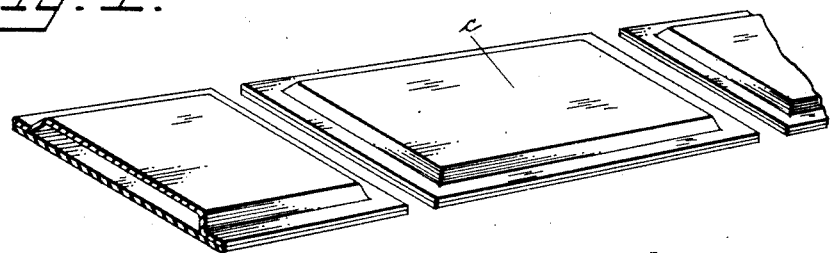
Attest:  Inventor:
  Henry Z. Cobb,
by
   his Atty.

UNITED STATES PATENT OFFICE.

HENRY Z. COBB, OF NEW YORK, N. Y., ASSIGNOR TO THE MECHANICAL RUBBER COMPANY, A CORPORATION OF NEW JERSEY.

PROCESS AND APPARATUS FOR PRODUCING A HOLLOW RUBBER BISCUIT.

1,349,560.

Specification of Letters Patent.  Patented Aug. 17, 1920.

Application filed September 23, 1919. Serial No. 325,654.

*To all whom it may concern:*

Be it known that I, HENRY Z. COBB, a citizen of the United States, residing at 464 Riverside Drive, New York city, county of New York, and State of New York, have invented certain new and useful Improvements in Processes and Apparatus for Producing Hollow Rubber Biscuits, of which the following is a full, clear, and exact description.

This invention relates to a process and apparatus for producing an inflated rubber article, commonly known as a biscuit, from which bulbs, hollow inflated toys and similar blown goods may be made.

Previously in the manufacture of these toys and other articles it has been common to cut blanks from sheet material, superpose two blanks after first powdering their adjacent surfaces to prevent adhesion, and then edge-join the blanks after first inserting a capsule of gas forming material. It is also necessary with this process to use a needle to force air into the space between the blanks in order to prevent adhesion before the vulcanizing temperature is raised sufficiently to generate gas from the capsule. This method is slow, expensive and unreliable. Another quicker method is to die out double-walled biscuits from die-formed tubing stock, but this tubing is lacking in the strength and toughness found in the calendered sheet stock.

The object of my present invention is to provide a process and an apparatus for carrying it out by which the biscuits may be die-formed from two sheets of calendered stock in a single operation, thereby producing a quickly and economically made article as in the tube process, but having all the advantages of one made from calendered stock and avoiding the necessity of inflating the article by needle as in the latter case.

In the drawings:

Figure 1 is a front elevation of an apparatus suitable for carrying out my process.

Fig. 2 is a side elevation of the pressure rolls, partly in section.

Fig. 3 is a perspective of the completed biscuits as cut apart.

In carrying out my process a sheet of calendered stock is formed with successive depressions along its length, the shape of which depressions will be varied according to the character of the finished article. This sheet of stock is then superposed upon a flat sheet and the two sheets joined by pressure around the margins of the depressions formed in the upper sheet, compressed air or other gas being at the same time injected into the space formed by the depressions, in order to prevent adhesion of the sheets at the point where the biscuit is to be formed. If desired the sheets may also be dusted with talc or other suitable powder on their adjacent faces in order to prevent adhesion. The sheets are then cut apart transversely along the lines where they have been joined by pressure, thus forming the biscuits shown in Fig. 3.

A suitable apparatus for carrying out my process has been shown in the drawings in which the numeral 1 represents a frame in which are mounted three superposed rolls. A main shaft 2 driven by a gear 3 from any suitable source of power extends through opposite sides of the frame and carries on the side opposite its gear 3 a second gear 4 meshing with a gear 5 mounted on the shaft 6 of the upper roll. A second gear 7 also meshing with the gear 4 is carried on a shaft 8 upon which is mounted the lower roll. The upper roll 9 is formed around its periphery with a series of elevated portions 10, which in the present instance are rectangular in form, but which may be of any shape depending upon the article to be produced. The body of the roll forms a depressed border 11 surrounding and spacing each elevated portion 10. The intermediate roll 12 is formed with a corresponding series of rectangular depressions 13 with which the projections 10 mesh or engage, the depressions 13 being surrounded by elevated portions or borders 14 which in turn mesh with the depressed portions 11 in the upper roll. The lower roll 15 is formed with a smooth surface which coacts with the raised portions 14 on the intermediate roll. A nozzle 16 is positioned to direct a blast of air between the intermediate and lower rolls as shown in Fig. 2.

In operation a sheet of calendered stock $a$ is passed between the upper and intermediate rolls as shown in Fig. 2, and by the interengaging elements on these rolls a series of depressions are formed in the sheet $a$. As the roll 12 revolves the sheet $a$ is carried around therewith and then passes backward between the intermediate and lower rolls in superposed position with respect to the second stock sheet *b* also passing between these rolls. Due to the pressure exerted between the projecting portions 14 and the roll 15 the two sheets are firmly united around the margins of the depressions in the upper sheet. The air or other gas ejected from the nozzle 16 enters the space formed by the depressions between the sheets *a* and *b* as they are pressed together and prevents adhesion. If desired talc or other powder may be also applied to the sheets between the portions to be united to aid in preventing adhesion. The biscuits thus formed by the lower sheet and the depressions in the upper sheet may then be cut apart along their transverse marginal lined portions as shown in Fig. 3, and the operation of making toys or other hollow articles from them be proceeded with. It is evident that the shape of the engaging elements in the forming rolls may be changed as desired depending upon the shape of the finished article to be produced from the biscuit. The raised portions 14 of the intermediate roll may be knurled or roughened as shown in Fig. 1 to aid in feeding the sheet *a* through and joining it to sheet *b*.

Having thus described my invention, what I claim as new and desire to protect by Letters Patent is:

1. In a machine for making hollow rubber biscuits from sheet stock, means for forming one sheet with a series of depressions connected and surrounded by flat portions of the sheet, and means for joining a second sheet under pressure to said flat portions.

2. In a machine for making hollow rubber article stock from sheet material, coacting means for forming depressions in one sheet with relatively raised portions surrounding and connecting the depressions and means coacting with said first means to join a second sheet by pressure to the raised portions.

3. In a machine for making hollow rubber biscuits from sheet material, a pair of pressure rolls having interengaging depressions and projections, a third roll coacting with the projections of one of said first rolls, means for feeding one sheet of material between said first pair of rolls and for then feeding said sheet together with a second sheet between said second-mentioned pair of rolls.

4. In a machine for making hollow rubber biscuits from sheet material, a pair of pressure rolls having interengaging depressions and projections, a third smooth-faced roll coacting with the projections of one of said first rolls, means for feeding one sheet of material between said first pair of rolls and for then feeding said sheet in superposed relation to a second sheet between said second-mentioned pair of rolls.

5. In a machine for making hollow rubber biscuits from sheet material, a roll having a series of rectangular projections spaced around its periphery, an intermediate roll having a series of rectangular depressions on its periphery spaced by a surrounding raised portion adapted to interfit with the spaces between the projections on said first roll, a third smooth-faced roll coacting with said raised portion, and means for feeding a sheet of stock between said first and intermediate rolls and then in superposed relation to a second sheet between the intermediate and third rolls.

6. In a machine for making hollow rubber biscuits from sheet material, coacting means for forming depressions in one sheet with relatively raised portions surrounding and connecting the depressions, means coacting with a part of said first means to join a second sheet by pressure to the raised portions, and means for preventing adhesion of the remaining portions of the sheets.

7. In a machine for making hollow rubber biscuits from sheet rubber, coacting means for joining two sheets of the rubber by pressure along lines forming closed figures, and means for preventing adhesion of the sheets within the spaces bounded by said closed figures.

8. In a machine for making inflated rubber biscuits from sheet material, coacting means for joining two sheets of material by pressure along their edges and also transversely at intervals and means for directing a gas between the sheets as they are joined.

9. In a machine for making inflated rubber biscuits from sheet material, means for preforming one sheet of stock with spaced depressions, means for joining by pressure a second sheet thereto around said depressions, and means for directing a blast into said depressions as they are closed by the second sheet.

10. The process of making inflated rubber biscuits for use in the manufacture of hollow rubber articles, which consists in superposing two sheets of rubber stock, successively joining portions of them by pressure along lines forming an inclosed figure, simultaneously injecting a gas between the portions of said sheet bounded by said figure and cutting apart the biscuits thus formed.

11. The process of making inflated rubber biscuits for use in the manufacture of hollow rubber articles which consists in forming successive depressions in one sheet of rubber stock, joining a second sheet to the first by pressure around the margins of the successive depressions, simultaneously supplying a gas to the space bounded by each depression as the sheets are joined, and cutting apart the biscuits thus formed.

Signed at New York, county of New York, State of New York, this 6th day of Sept., 1919.

HENRY Z. COBB.